United States Patent
Liang et al.

(10) Patent No.: US 11,188,486 B2
(45) Date of Patent: Nov. 30, 2021

(54) MASTER CHIP, SLAVE CHIP, AND INTER-CHIP DMA TRANSMISSION SYSTEM

(71) Applicant: SHENZHEN GOODIX TECHNOLOGY CO., LTD., Guangdong (CN)

(72) Inventors: Zhibing Liang, Shenzhen (CN); Yifan Li, Shenzhen (CN); Zekai Chen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/697,122

(22) Filed: Nov. 26, 2019

(65) Prior Publication Data
US 2020/0097424 A1 Mar. 26, 2020

Related U.S. Application Data
(63) Continuation of application No. PCT/CN2018/102020, filed on Aug. 23, 2018.

(51) Int. Cl.
*G06F 13/38* (2006.01)
*G06F 13/28* (2006.01)
(Continued)

(52) U.S. Cl.
CPC ............ *G06F 13/28* (2013.01); *G06F 13/124* (2013.01); *G06F 13/1673* (2013.01); *G06F 13/32* (2013.01)

(58) Field of Classification Search
None
See application file for complete search history.

(56) References Cited

U.S. PATENT DOCUMENTS

| | | | | |
|---|---|---|---|---|
| 5,590,377 A | * | 12/1996 | Smith | G06F 13/28 710/22 |
| 6,154,793 A | * | 11/2000 | MacKenna | G06F 13/28 710/10 |
| 6,401,143 B1 | * | 6/2002 | Lupien, Jr | H04N 1/32368 710/22 |

(Continued)

FOREIGN PATENT DOCUMENTS

CN 1700196 A 11/2005
CN 101034383 A 9/2007
(Continued)

OTHER PUBLICATIONS

Extended European Search Report dated Oct. 5, 2020, Patent Application No. 18919395.6, 8 pages.
(Continued)

*Primary Examiner* — Hyun Nam
(74) *Attorney, Agent, or Firm* — USCH Law, PC

(57) ABSTRACT

The present disclosure relates to the technical field of a multi-chip system, and provides a master chip, a salve chip, and an inter-chip DMA transmission system. The master chip is connected to the slave chip through at least one first transmission channel (17) and a second transmission channel (18). The master chip includes a DMA controller (2) and an MCU (3). For each of the first transmission channels, when it is detected that any first transmission channel (17) is in an idle state, the MCU (3) configures one of a plurality of first peripherals (12) of the slave chip into a DMA mode. The DMA controller (2) is configured to receive, through the first transmission channel (17), a DMA request (req_s_0-req_s_N) generated by the first peripheral (12) in the DMA mode, and obtain a DMA data of the first peripheral (12) through the second transmission channel (18).

16 Claims, 10 Drawing Sheets

(51) Int. Cl.
G06F 13/12 (2006.01)
G06F 13/16 (2006.01)
G06F 13/32 (2006.01)

(56) References Cited

U.S. PATENT DOCUMENTS

| | | | | |
|---|---|---|---|---|
| 2004/0049293 | A1* | 3/2004 | Hadwiger | G06F 15/7846 700/4 |
| 2006/0149862 | A1* | 7/2006 | Zaabab | G06F 13/28 710/22 |
| 2008/0172749 | A1* | 7/2008 | Ko | G06F 12/1441 726/27 |
| 2009/0138645 | A1* | 5/2009 | Chun | G06F 13/28 710/308 |
| 2010/0100652 | A1* | 4/2010 | Lin | G06F 3/023 710/73 |
| 2011/0040920 | A1* | 2/2011 | Chou | G06F 13/28 710/316 |
| 2014/0306688 | A1* | 10/2014 | Crooks | G01R 23/16 324/76.23 |

FOREIGN PATENT DOCUMENTS

| | | |
|---|---|---|
| CN | 202563495 U | 11/2012 |
| CN | 106951388 A | 7/2017 |

OTHER PUBLICATIONS

International Search Report mailed in International Patent Application No. PCT/CN2018/102020, filed on Aug. 23, 2018, 5 pages.

* cited by examiner

MASTER CHIP, SLAVE CHIP, AND INTER-CHIP DMA TRANSMISSION SYSTEM

CROSS REFERENCE TO RELATED APPLICATIONS

The present application is a continuation of international application No. PCT/CN2018/102020, filed on Aug. 23, 2018, which is hereby incorporated by reference in its entirety.

TECHNICAL FIELD

The present disclosure relates to the technical field of a multi-chip system, and in particular, to a master chip, a salve chip, and a DMA transmission system between chips.

BACKGROUND

In a direct memory access (DMA) transmission scheme, a DMA controller may directly implement high-speed data transmission between memories, or between a memory and a peripheral in a hardware manner. However, an inter-chip DMA transmission scheme is used in only a few existing dual-chip or multi-chip systems, to implement data transmission between a slave chip and a master chip. In addition, there is a relatively single transmission task in the inter-chip DMA transmission scheme, and a DMA transmission channel can be established usually only between the master chip and a specific peripheral of the slave chip, that is, DMA data transmission can only be completed between the master chip and the specific peripheral of the slave chip, and the foregoing DMA transmission channel cannot be used by the other peripherals of the slave chip to perform data transmission.

SUMMARY

Some embodiments of the present disclosure are intended to provide a master chip, a slave chip, and a DMA transmission system between chips, so that the master chip may perform DMA data transmission with a plurality of first peripherals of the slave chip.

An embodiment of the present disclosure provides a master chip, the master chip being connected to a slave chip through at least one first transmission channel and being connected to the slave chip through a second transmission channel; the master chip including a direct memory access (DMA) controller and a micro control unit (MCU), the MCU being connected to the DMA controller; for each first transmission channel, the MCU being configured to configure one of a plurality of first peripherals of the slave chip into a DMA mode when it is detected that the first transmission channel is in an idle state; and the DMA controller being configured to receive, through the first transmission channel, a DMA request generated by the first peripheral in the DMA mode, and obtain a DMA data of the first peripheral through the second transmission channel when receiving the DMA request.

An embodiment of the present disclosure further provides a slave chip, the slave chip being connected to a master chip through at least one first transmission channel and at least one second transmission channel, and the master chip being the foregoing master chip; and the slave chip including a plurality of first peripherals, any of the first peripherals in a DMA mode outputting a generated DMA request to the master chip through a corresponding first transmission channel, and a DMA data of the first peripheral being output to the master chip through the second transmission channel.

An embodiment of the present disclosure further provides an inter-chip DMA transmission system, including the foregoing master chip and at least one of the foregoing slave chips, the master chip being connected to the slave chip through at least one first transmission channel and being connected to the slave chip through a second transmission channel.

An embodiment of the present disclosure further provides a master chip, the master chip being connected to a slave chip through a first transmission channel and a second transmission channel respectively; and the master chip including a DMA controller, the DMA controller being configured to obtain, through the first transmission channel or the second transmission channel, all current DMA requests stored in a DMA register of the slave chip, and obtain, through the second transmission channel, a DMA data that is of a first peripheral and that corresponds to each of the DMA requests.

An embodiment of the present disclosure further provides a slave chip, the slave chip being connected to a master chip through a first transmission channel and a second transmission channel respectively, and the master chip being the foregoing master chip; the slave chip including a DMA register and a plurality of first peripherals, the DMA register being respectively connected to the plurality of first peripherals, and any of the first peripherals sending a generated DMA request to the DMA register in a DMA mode.

An embodiment of the present disclosure further provides an inter-chip DMA transmission system, including the foregoing master chip and at least one of the foregoing slave chips, the master chip being connected to the slave chip through a first transmission channel and a second transmission channel respectively.

In comparison to the existing technology, in the embodiments of the present disclosure, at least one first transmission channel and a second transmission channel are disposed between a slave chip and a master chip, and the master chip may obtain DMA requests of a plurality of first peripherals of the slave chip through the first transmission channel or the second transmission channel, and obtain, through the second transmission channel, a DMA data that is of the first peripheral and that corresponds to each DMA request, so that the master chip may perform DMA data transmission with the plurality of first peripherals of the slave chip.

In addition, the MCU is further configured to configure, in the DMA controller, a block size and a burst size that are of each of the first peripherals; and the DMA controller is configured to obtain, when receiving the DMA request, DMA data buffered in the first peripheral, until a total amount of obtained DMA data of the first peripheral reaches the block size, where after the first peripheral is configured into a DMA mode, the DMA request is generated when a current total amount of the DMA data buffered in the first peripheral reaches the burst size. The block size and the burst size that are of each of the first peripherals are preset, so that the master chip may quantitatively obtain DMA data of each first peripheral.

In addition, the master chip further includes an interrupt controller, the interrupt controller being connected between the DMA controller and the MCU; the DMA controller being further configured to output, when the total amount of the obtained DMA data of the first peripheral reaches the block size, an interrupt signal to the MCU through the interrupt controller; and the MCU being configured to determine, when receiving the interrupt signal, that the first transmission channel for transmitting the DMA request of the first peripheral is in an idle state. A method for determining whether a first transmission channel is in an idle state is provided.

In addition, the master chip further includes a DMA request detecting module, the DMA request detecting module being connected to the DMA controller; and the DMA request detecting module being configured to detect the DMA request sent through the first transmission channel, and send the DMA request to the DMA controller. The DMA request detecting module is configured to detect the first transmission channel in real time, which is beneficial to discover the DMA request of the slave chip in time.

In addition, the first transmission channel is a DMA request line. A specific implementation of the first transmission channel is provided.

In addition, the master chip further includes at least one first data transmission interface, one end of the first data transmission interface being connected to the DMA controller, and the other end of the first data transmission interface being connected to the slave chip, to form the second transmission channel. A specific implementation of the second transmission channel is provided.

In addition, the master chip further includes a DMA request transport module, the DMA request transport module being connected to the DMA controller, the DMA request transport module being configured to automatically control the second transmission channel using hardware, to obtain all current DMA requests stored in the DMA register when the DMA request output by the first peripheral through the first transmission channel is received, and send all the DMA requests to the DMA controller; and the DMA controller being configured to obtain, through the second transmission channel, DMA data that is of the first peripheral and that corresponds to each of the DMA requests. The DMA request transport module is configured to automatically control the second transmission channel using hardware, to obtain the current DMA requests stored in the DMA register when the DMA request is received, which is beneficial to obtain a DMA request of the slave chip in time and can help share pressure of the DMA controller.

In addition, the DMA register is configured to send all currently stored DMA requests to the master chip through the first transmission channel when the DMA request sent by any of the first peripherals is received. A method for obtaining all current DMA requests of a slave chip by a master chip is provided.

In addition, the first peripheral is further configured to output the generated DMA request to the master chip through the first transmission channel, to remind the master chip to obtain all current DMA requests stored in the DMA register. Another method for obtaining all current DMA requests of a slave chip by a master chip is provided.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, the technical solutions, and the advantages of the present disclosure clearer, the following further describes some embodiments of the present disclosure in detail with reference to the accompanying drawings and the embodiments. It should be understood that the specific embodiments described herein are merely used to illustrate the present disclosure, and are not intend to limit the present disclosure.

A first embodiment of the present disclosure relates to a master chip. The master chip may be a master chip in a multi-chip system, where the multi-chip system may include a master chip and at least one slave chip, and the master chip may be connected to the slave chip through at least one first transmission channel and a second transmission channel respectively.

Figure 1:
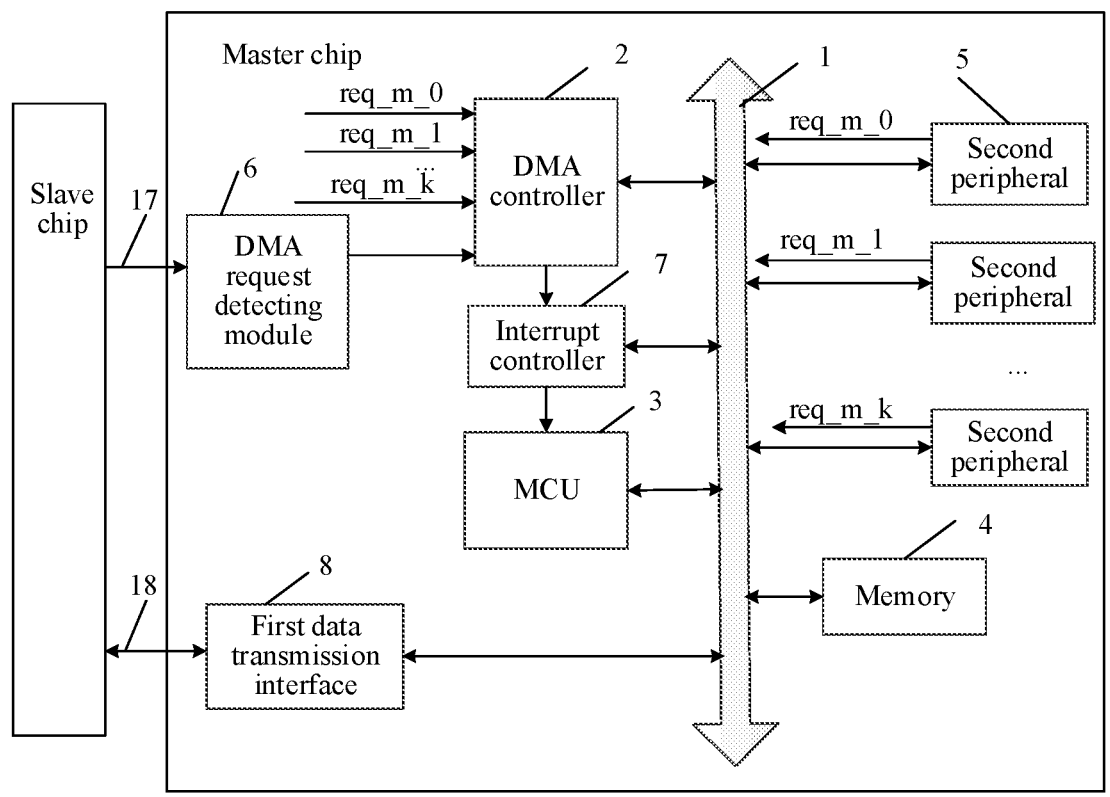
FIG. 1 is a schematic structural diagram of a master chip according to a first embodiment of the present disclosure.

As shown in FIG. 1, the master chip may include a first bus 1, a DMA controller 2, a microcontroller unit (MCU) 3, a memory 4, and a plurality of second peripherals 5. The DMA controller 2, the MCU 3, the memory 4, and the plurality of second peripherals 5 are connected to the first bus 1, and the DMA controller 2 is further connected to the plurality of second peripherals 5. The master chip may be connected to the slave chip through at least one first transmission channel 17 (only one first transmission channel 17 is shown in FIG. 1) and a second transmission channel 18. The first transmission channel 17 is configured to transmit a DMA request generated by a first peripheral 12 (shown in FIG. 3) of the slave chip to the master chip, and the second transmission channel 18 is configured to transmit a DMA data of the first peripheral 12 of the slave chip to the master chip.

In particular, the DMA controller 2 of the master chip may be directly connected to a corresponding interface (such as a DMA request pin output module 10 in FIG. 3) of the slave chip through at least one first transmission channel 17. The first transmission channel 17 may be a DMA request line, that is, one or more DMA request lines may be connected between the DMA controller 2 and the corresponding interface of the slave chip, and each DMA request line is one first transmission channel 17.

The master chip may further include at least one first data transmission interface 8, one end of the first data transmission interface 8 is connected to the DMA controller 2 using the first bus 1, and the other end is connected to a data transmission interface (such as a second data transmission interface 11 shown in FIG. 3) corresponding to the slave chip, so that the second transmission channel 18 is formed between the first data transmission interface 8 of the master chip and the data transmission interface corresponding to the slave chip. When there is one first data transmission interface 8, and there is more than one slave chip, the other end of the first data transmission interface 8 may be separately connected to each slave chip, to establish the second transmission channel 18 between the master chip and each slave chip. Alternatively, when a quantity of first data transmission interfaces 8 is the same as a quantity of slave chips, each first data transmission interfaces 8 may be correspondingly connected to one slave chip, to establish the second transmission channel 18 between the master chip and each slave chip.

Figure 3:
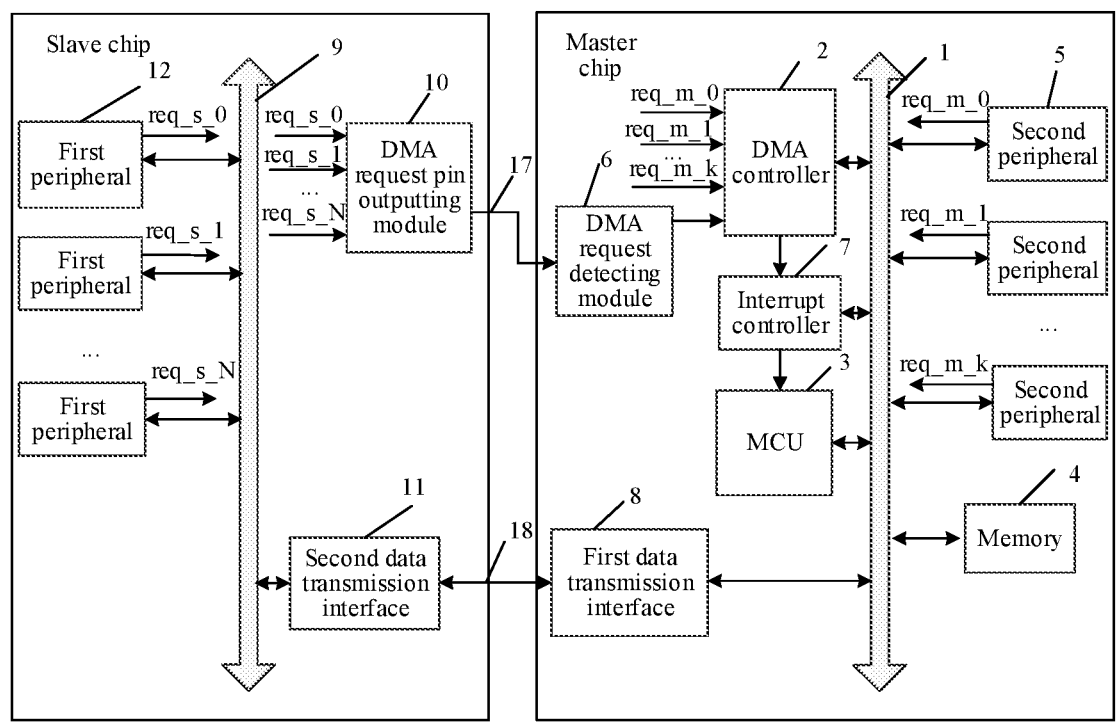
FIG. 3 and FIG. 4 are schematic diagrams of an inter-chip DMA transmission system according to a fourth embodiment of the present disclosure.

Referring to FIG. 3, for each first transmission channel 17, the MCU 3 is configured to configure one of a plurality of first peripherals 12 of the slave chip into a DMA mode when it is detected that the first transmission channel 17 is in an idle state; and the DMA controller 2 is configured to receive, through the first transmission channel 17, a DMA request generated by the first peripheral 12 in the DMA mode, and obtain the DMA data of the first peripheral 12 through the second transmission channel 18 when receiving the DMA request.

In particular, in this embodiment, each first transmission channel 17 can only be occupied by one first peripheral 12 of the slave chip at the same time. When the MCU 3 detects that a certain first transmission channel 17 is currently in an idle state, that is, is not currently occupied by any of the first peripherals 12, a working mode of one of the first peripherals 12 may be configured into a DMA mode, and the first transmission channel 17 in the idle state is allocated to the first peripheral 12, so that the first peripheral 12 occupies the first transmission channel 17. After occupation, the first peripheral 12 may output a generated DMA request to the master chip through the first transmission channel 17. The DMA controller 2 on the master chip may obtain the DMA data of the first peripheral 12 through the second transmission channel 18 when receiving the DMA request sent by the first peripheral 12, and the DMA controller 2 stores the obtained DMA data into the memory 4. When the DMA data of the first peripheral 12 is transmitted completely, the MCU 3 may release a correspondence between the first peripheral 12 and the first transmission channel 17 currently occupied. In this case, the first transmission channel 17 returns to an idle state, and the MCU 3 may allocate the first transmission channel 17 to another first peripheral 12 that is currently configured into a DMA mode.

It is assumed that a first peripheral N0 exists in the plurality of first peripherals 12, DMA data transmission between the first peripheral N0 and the master chip is used as an example for description below. If there is one first transmission channel 17 (that is, a plurality of first peripherals of the salve chip correspond to one first transmission channel 17), when it is detected that a current first transmission channel 17 is in an idle state (that is, none of the first peripherals 12 is currently configured into a DMA mode), the MCU 3 may configure the first peripheral N0 into a DMA mode, so that the first transmission channel 17 currently in the idle state is allocated to the first peripheral N0, and the first peripheral N0 occupies the first transmission channel 17. When the first peripheral N0 generates a DMA request, the DMA request is output to the master chip by the DMA request pin output module 10 of the slave chip through the first transmission channel 17. The DMA controller 2 on the master chip may obtain the DMA data of the first peripheral N0 through the second transmission channel 18 when receiving the DMA request sent by the first peripheral N0, and store the obtained DMA data into the memory 4.

If a quantity of first transmission channels is M, M being greater than 1 and less than or equal to N (N is a quantity of first peripherals 12 on the slave chip, N being greater than 1), in this case, the MCU 3 configures working modes of M first peripherals 12 into DMA modes at most at a time. DMA data transmission between the first peripheral N0 and the master chip is still used as an example. When it is detected that one of the first transmission channels 17 is in an idle state (that is, there is a first transmission channel 17 that is not currently occupied by any of the first peripherals 12), the MCU 3 may configure the first peripheral N0 into a DMA mode, and allocate the first transmission channel 17 to the first peripheral N0, so that the first peripheral N0 occupies the first transmission channel 17. When the first peripheral N0 generates a DMA request, the DMA request is output to the master chip by the DMA request pin outputting module 10 of the slave chip through the first transmission channel 17. The DMA controller 2 on the master chip may obtain the DMA data of the first peripheral N0 through the second transmission channel 18 when receiving the DMA request sent by the first peripheral N0, and store the obtained DMA data into the memory 4. It is worth mentioning that when a quantity of first transmission channels 17 is M, fixed mapping relationship between N first peripherals 12 and M first transmission channels 17 may further be established. For example, the slave chip has six first peripherals 12, which are respectively a first peripheral N0, a first peripheral N1, . . . , and a first peripheral N6, and there are three first transmission channels 17 between the slave chip and the master chip, which are respectively a first transmission channel M0, a first transmission channel M1, and a first transmission channel M2. Therefore, the first peripheral N0 and the first peripheral N1 may fixedly correspond to the first transmission channel M0, the first peripheral N1 and the first peripheral N2 may fixedly correspond to the first transmission channel M1, and the first peripheral N4 and the first peripheral N5 may fixedly correspond to the first transmission channel M2. In this way, each first peripheral can be configured into a DMA mode by the MCU 3 and occupies the fixedly corresponding first transmission channel only when a fixedly corresponding first transmission channel is in an idle state. For example, the MCU 3 first determines whether a current first transmission channel M0 is occupied by the first peripheral N1 before configuring the first peripheral N0 into a DMA mode. When it is determined that the first transmission channel M0 is not occupied, the MCU 3 configures the first peripheral N0 into the DMA mode. It is worth mentioning that the fixed mapping relationship between N first peripherals 12 and M first transmission channels 17 are not limited in the embodiment. Mapping relationship between N first peripherals 12 and M first transmission channels 17 may be dynamically configured, that is, as long as it is detected that there is a first transmission channel 17 in an idle state, any of the first peripherals 12 may be configured into a DMA mode, and the first transmission channel 17 is allocated to the first peripheral 12 currently configured into the DMA mode.

Alternatively, the master chip may further include a DMA request detecting module 6, and the DMA controller 2 may be connected to the DMA request detecting module 6, and is connected to the first transmission channel 17 through the DMA request detecting module 6. The DMA request detecting module 6 is configured to detect the first transmission channel 17 in real time, and send the DMA request to the DMA controller 2 when detecting a DMA request sent by the first peripheral 12 on the slave chip through the first transmission channel 17. The DMA request detecting module 6 detects the first transmission channel 17 in real time, which is beneficial to discover the DMA request of the slave chip in time. In actual application, the DMA request detecting module 6 may not be disposed, and the DMA controller 2 directly receives the DMA request sent by the slave chip through the first transmission channel 17, which is not limited in this embodiment.

Preferably, in this embodiment, the master chip may further include an interrupt controller 7, and the interrupt controller 7 may be connected between the DMA controller 2 and the MCU 3. After DMA data of a certain first peripheral 12 is transported completely, the DMA controller 2 may send an interrupt signal to the MCU 3 through the interrupt controller 7, to prompt the MCU 3. When the MCU 3 receives the interrupt signal, it may be determined that the first transmission channel 17 previously occupied by the first peripheral (the first peripheral of which the DMA data is transported completely) 12 is currently in the idle state, and the MCU 3 may allocate the first transmission channel 17 to another first peripheral 12. It is worth mentioning that the MCU 3 may further change configuration of the first peripheral 12 of which DMA data is transported completely, such as changing a working mode of the first peripheral 12 from a DMA mode to another mode.

In addition, it is worth mentioning that the second peripheral 5 on the master chip may directly send, in a DMA mode, a generated DMA request to the DMA controller 2. The DMA controller 2 may access and obtain the corresponding second peripheral 5 through the first bus 1 when receiving the DMA request sent by the second peripheral 5, obtain DMA data of the second peripheral 5, and then store the obtained DMA data into the memory 4.

In comparison to the existing technology, in this embodiment, at least one first transmission channel 17 and a second transmission channel 18 are disposed between a slave chip and a master chip, and when it is detected that a first transmission channel 17 is in an idle state, the master chip configures one of the first peripherals 12 of the slave chip into a DMA mode, and allocates the first transmission channel 17 to the first peripheral 12 for the first peripheral 12 to send a DMA request. When DMA data transmission is completed between the first peripheral 12 and the master chip through the second transmission channel 18, the master chip releases the first transmission channel 17, so that the first transmission channel 17 returns to an idle state and may be allocated to another first peripheral 12, so that the master chip may perform DMA data transmission with a plurality of first peripherals 12 on the slave chip.

A second embodiment of the present disclosure relates to a master chip. The second embodiment is further improved on the basis of the first embodiment, and a main modification is that: in this embodiment, the MCU 3 further configures, in the DMA controller 2 in advance, a block size and a burst size that are of each first peripheral 12.

In particular, in this embodiment, before the first peripheral 12 of the slave chip performs DMA data transmission with the master chip, the MCU 3 in the master chip configures a relevant register of the DMA controller 2 in advance, for example, configures a DMA request of the slave chip as a request source of a certain channel of the DMA controller 2, and configures a DMA channel to be enabled, a DMA source address, a DMA destination address, and a block size and a burst size that are of each first peripheral 12.

After the relevant register of the DMA controller 2 is configured, when it is detected that there is a first transmission channel 17 that is currently in an idle state, the MCU 3 may access the slave chip through the second transmission channel 18, to configure a register of one first peripheral 12 on which DMA data transmission is currently required, and may allocate the first transmission channel 17, for example, configure a working mode of the first peripheral 12 into a DMA mode, and allocate the first transmission channel in the idle state to the first peripheral 12 that is currently configured into the DMA mode. Afterwards, during operation of the first peripheral 12, a DMA request is generated when a current total amount of DMA data buffered in a register (that is, the register of the first peripheral 12) reaches the burst size. The generated DMA request is output to the master chip by the DMA request pin output module of the slave chip through a corresponding first transmission channel (that is, a first transmission channel allocated to the first peripheral) 17.

The DMA request detecting module 6 of the master chip sends the DMA request to the DMA controller 2 when detecting the DMA request. The DMA controller 2 obtains, through the second transmission channel 18, all DMA data (that is, DMA data of a burst size) currently buffered by the first peripheral 12 when the DMA request is received. Afterwards, when a current total amount of DMA data buffered in the register of the first peripheral 12 reaches the burst size again, a DMA request is further generated and output to the master chip through a corresponding first transmission channel 17. The DMA controller 2 of the master chip still obtains, through the second transmission channel 18, all DMA data (that is, DMA data of a burst size) currently buffered by the first peripheral 12 when the DMA request is received, until a total amount of DMA data that is of the first peripheral 12 and that is obtained by the DMA controller 2 reaches the block size. In this case, the DMA controller 2 may output an interrupt signal to the MCU 3 through the interrupt controller 7. When the MCU 3 receives the interrupt signal, it may be determined that the first transmission channel 17 for transmitting the DMA request of the first peripheral 12 is currently in an idle state.

In comparison to the first embodiment, in this embodiment, the MCU configures, in the DMA controller 2, a block size and a burst size that are of each first peripheral 12, so that the master chip can quantitatively obtain DMA data of each first peripheral 12.

A third embodiment of the present disclosure relates to a slave chip. The slave chip may be a slave chip in a multi-chip system, the multi-chip system may include a master chip and at least one slave chip, and each slave chip may be connected to the master chip through at least one first transmission channel 17 and a second transmission channel 18 respectively. The master chip may be the master chip according to the first embodiment or the second embodiment.

Figure 2:
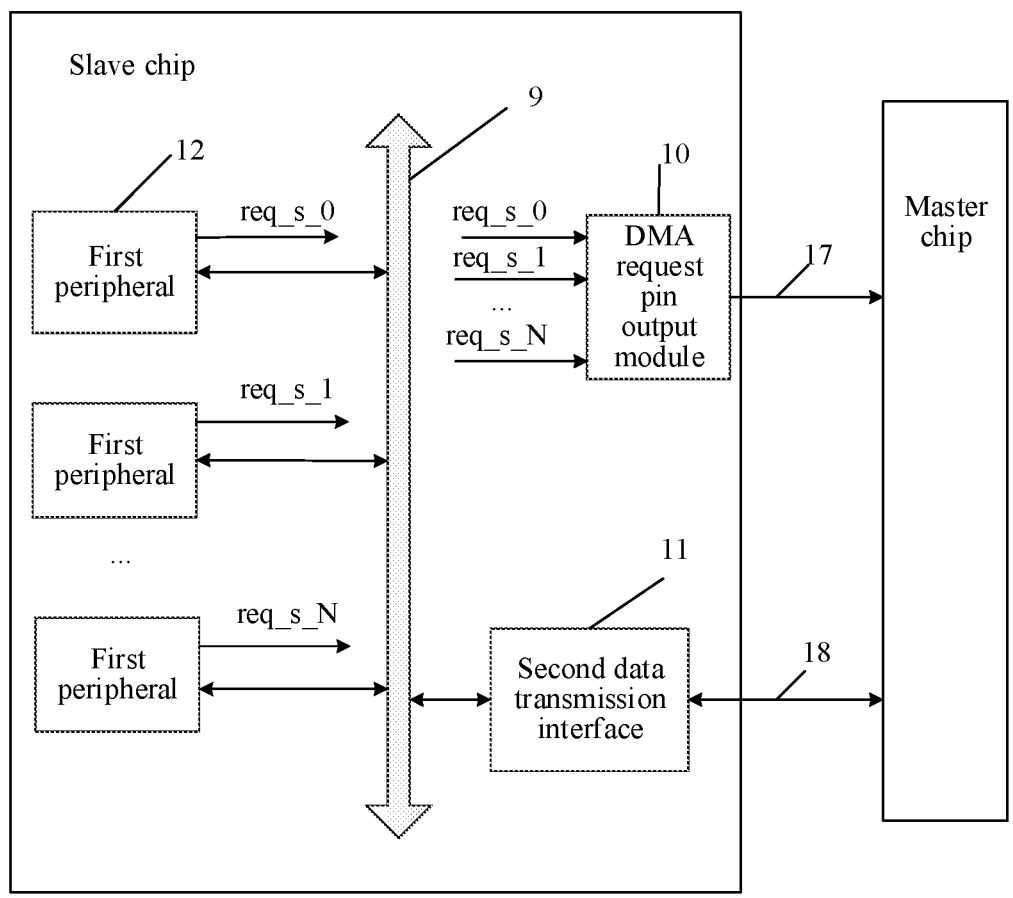
FIG. 2 is a schematic structural diagram of a slave chip according to a third embodiment of the present disclosure.

As shown in FIG. 2, the slave chip includes a second bus 9, a DMA request pin outputting module 10, a second data transmission interface 11, and a plurality of first peripherals 12. The second data transmission interface 11 and the plurality of first peripherals 12 are connected to the second bus 9, and the DMA request pin output module 10 is connected to the plurality of first peripherals 12.

If there is one first transmission channel 17, the DMA request pin output module 10 may include only one output pin, the output pin being connected to the first transmission channel 17. Any first peripheral 12 outputs, in a DMA mode, a generated DMA request to the output pin through the DMA request pin outputting module 10, and the output pin outputs the DMA request to the master chip through the first transmission channel 17. It is worth mentioning that when there is one first transmission channels 17, the MCU 3 configures only one first peripheral 12 into a DMA mode at the same time, so as to ensure that a unique first transmission channel 17 is occupied only by one first peripheral 12 at the same time. It should be noted that the DMA request pin output module 10 is generally an entity hardware module.

Figure 4:
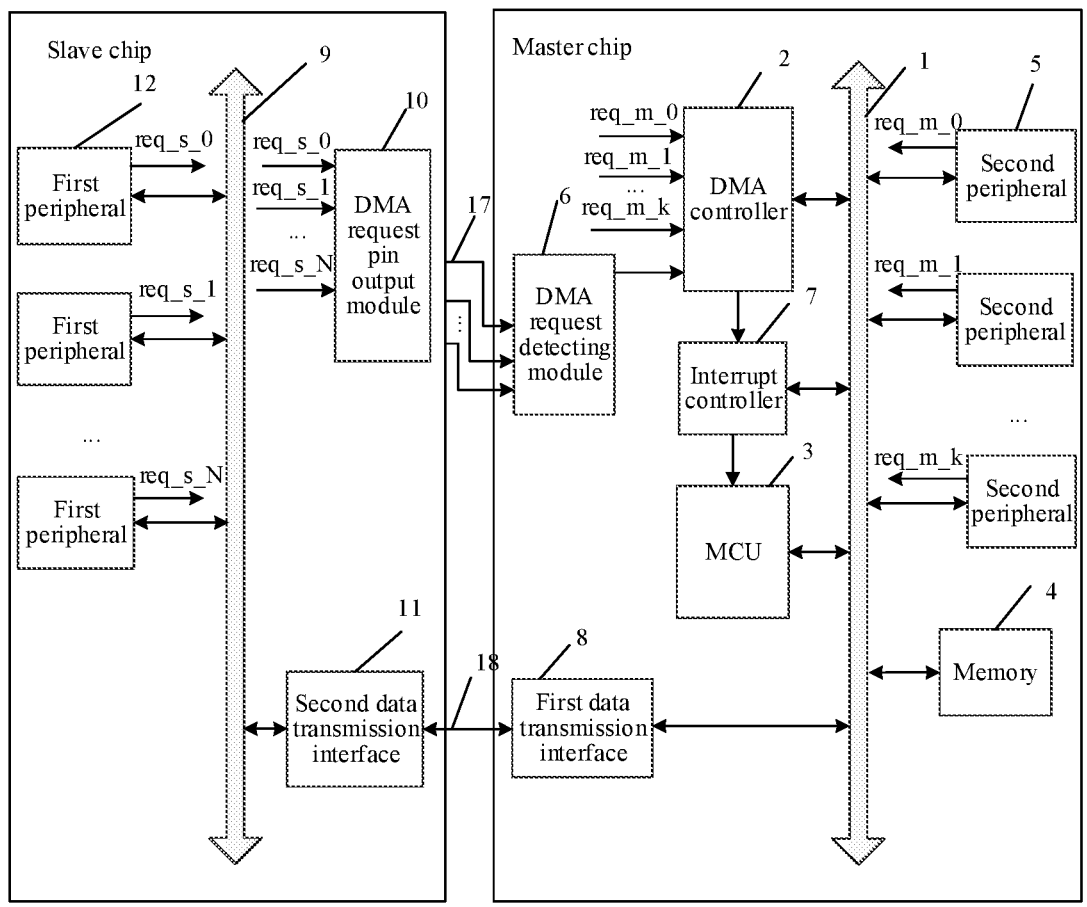

Referring to FIG. 4, if a quantity of first transmission channels 17 is M, M being greater than 1 and less than or equal to N, where N is a quantity of first peripherals on the slave chip, N being greater than 1, the DMA request pin output module 10 includes M output pins, and each output pin is correspondingly connected to one first transmission channel 17. A certain first peripheral 12 currently configured into a DMA mode outputs the generated DMA request to a corresponding output pin (the output pin is connected to the first transmission channel allocated to the first peripheral) when generating the DMA request, and the corresponding output pin outputs the DMA request to the master chip through the first transmission channel 17 to which the output pin is connected.

The master chip accesses the slave chip through the second transmission channel 18 when receiving the DMA request sent by the slave chip through the first transmission channel 17, and obtains DMA data that is of the first peripheral 12 and that corresponds to the DMA request. The second transmission channel 18 may be formed by connecting a second data transmission interface 11 to a first data transmission interface 8 on the master chip. In other words, the master chip may access the slave chip through the second data transmission interface 11 when receiving the DMA request sent by the slave chip through the first transmission channel 17, and obtain DMA data that is of the first peripheral 12 and that corresponds to the DMA request through the second data transmission interface 11 and the second bus 9.

Because this embodiment may be implemented in mutual cooperation with the first embodiment or the second embodiment, related technical details mentioned in the first embodiment or the second embodiment are still valid in this embodiment, and a technical effect that can be achieved in the first embodiment or the second embodiment may also be achieved in this embodiment. In order to reduce repetition, details are not described herein again. Correspondingly, related technical details mentioned in this embodiment may also be applied to the first embodiment or the second embodiment.

In comparison to the existing technology, in this embodiment, at least one first transmission channel 17 and a second transmission channel 18 are disposed between a slave chip and a master chip. When it is detected that a first transmission channel 17 is in an idle state, the master chip configures one of the first peripherals 12 of the slave chip into a DMA mode, and allocates the first transmission channel 17 to the first peripheral 12 for the first peripheral 12 to send a DMA request. When DMA data transmission between the first peripheral 12 and the master chip is completed through the second transmission channel 18, the master chip releases the first transmission channel 17. In this way, the first transmission channel 17 returns to an idle state and may be allocated to another first peripheral 12, so that the master chip may perform DMA data transmission with a plurality of peripherals on the slave chip.

A fourth embodiment of the present disclosure relates to an inter-chip DMA transmission system. The DMA transmission system includes the master chip according to the first embodiment or the second embodiment, and at least one slave chip according to the third embodiment.

As shown in FIG. 3 and FIG. 4, the master chip is connected to the slave chip through at least one first transmission channel 17, and is connected to the slave chip through a second transmission channel 18.

In comparison to the existing technology, in this embodiment, at least one first transmission channel 17 and a second transmission channel 18 are disposed between a slave chip and a master chip. When it is detected that a first transmission channel 17 is in an idle state, the master chip configures one of the first peripherals 12 of the slave chip into a DMA mode, and allocates the first transmission channel 17 to the first peripheral 12 for the first peripheral 12 to send a DMA request. When DMA data transmission between the first peripheral 12 and the master chip is completed through the second transmission channel 18, the master chip releases the first transmission channel 17. In this way, the first transmission channel 17 returns to an idle state and may be allocated to another first peripheral 12, so that the master chip may perform DMA data transmission with a plurality of peripherals on the slave chip.

A fifth embodiment of the present disclosure relates to a master chip. The master chip may be a master chip in a multi-chip system, the multi-chip system may include a master chip and at least one slave chip, and the master chip may be connected to the slave chip through a first transmission channel 17 and a second transmission channel 18 respectively.

Figure 5:
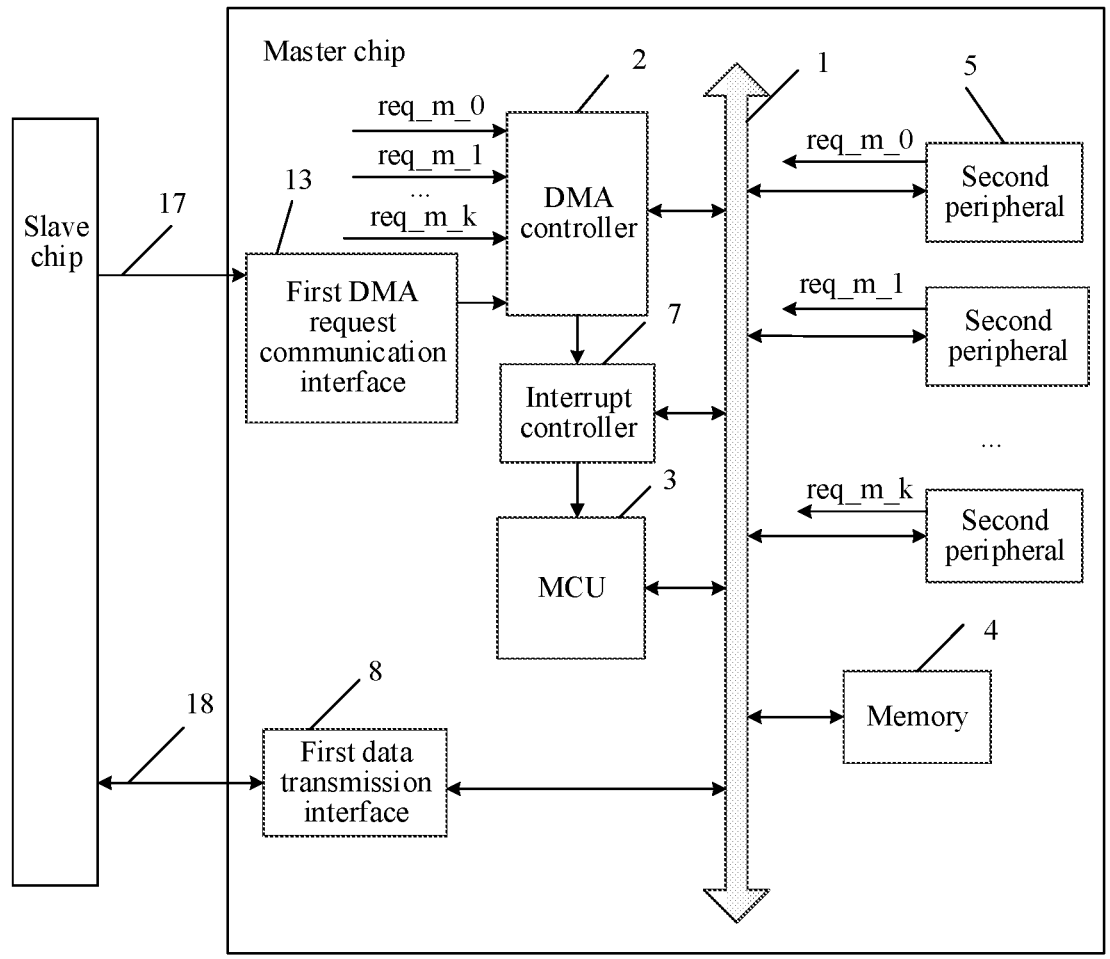
FIG. 5 is a schematic structural diagram of a master chip according to a fifth embodiment of the present disclosure.

As shown in FIG. 5, the master chip may include a first bus 1, a DMA controller 2, an MCU 3, a memory 4, a first DMA request communication interface 13, and a plurality of second peripherals 5. The DMA controller 2, the MCU 3, the memory 4, and the plurality of second peripherals 5 are connected to the first bus 1, and the DMA controller 2 is further connected to the plurality of second peripherals 5 and the first DMA request communication interface 13.

Figure 9:
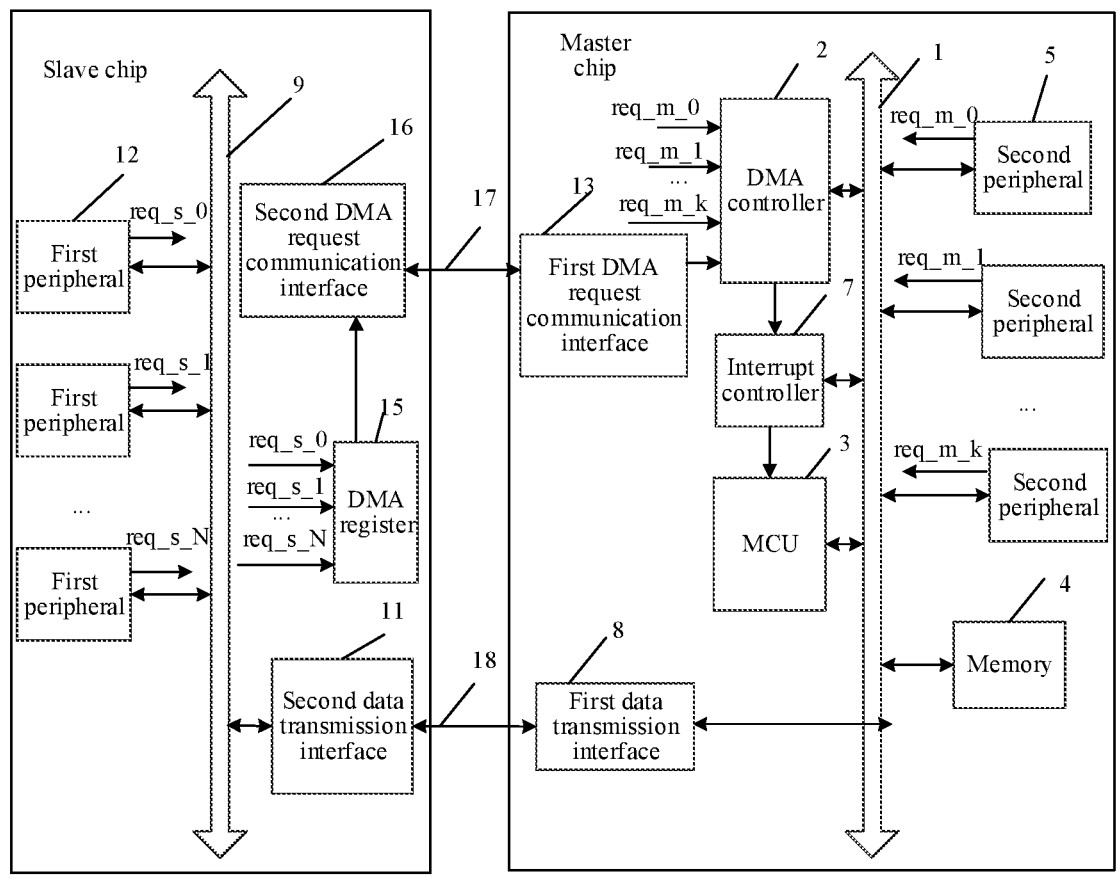
FIG. 9 is a schematic diagram of an inter-chip DMA transmission system according to a tenth embodiment of the present disclosure.

Referring to FIG. 9, in this embodiment, the DMA controller 2 is configured to obtain, through the first transmission channel 17, all current DMA requests stored in a DMA register 15 of the slave chip, and obtain, through the second transmission channel 18, a DMA data that is of a first peripheral 12 and that corresponds to each DMA request.

In particular, in this embodiment, the slave chip includes a DMA register 15 and a second DMA request communication interface 16, one end of the DMA register being connected to a plurality of first peripherals 12 on the slave chip, and the other end being connected to the second DMA request communication interface 16.

The MCU 3 on the master chip accesses the slave chip through the second transmission channel 18 in advance, and configures working modes of the plurality of first peripherals 12 on the slave chip into DMA modes. Any of the first peripherals 12 sends, in the DMA mode, a generated DMA request to the DMA register 15 for storage. When receiving the DMA request sent by the first peripheral 12, the DMA register 15 triggers the second DMA request communication interface 16 to automatically send, using hardware, a current value of the DMA register 15 to the master chip through the first transmission channel 17. The current value of the DMA register represents all current DMA requests of the slave chip.

The first DMA request communication interface 13 on the master chip is configured to receive a DMA request (that is, the current value of the DMA register) sent by the slave chip through the first transmission channel 17, and send the DMA request to the DMA controller 2. The DMA controller 2 may obtain, through the second transmission channel 18, DMA data that is of the first peripheral 12 and that corresponds to each DMA request when all current DMA requests of the slave chip are received, and store the obtained DMA data into the memory 4. In particular, when all current DMA requests of the slave chip are received, the DMA controller 2 may successively obtain, in descending order of priorities of DMA requests, DMA data that is of the first peripheral 12 and that corresponds to each DMA request. However, this is not limited thereto. In actual application, a priority may be set for each first peripheral 12 according to the significance of each first peripheral 12. When all current DMA requests of the slave chip are received, the DMA controller 2 may first determine the first peripheral 12 that corresponds to each DMA request, and then successively obtain, in descending order of priority, DMA data of each first peripheral 12 in according with the determined priorities of first peripherals 2.

It is worth mentioning that in this embodiment, that the first DMA request communication interface 13 is disposed on the master chip, the second DMA request communication interface 16 is disposed on the slave chip, and the first DMA request communication interface 13 is connected to the second DMA request communication interface 16, to form a first transmission channel 17 used as an example for description. However, this is not limited thereto. In actual application, a DMA request line may also be directly used to form the first transmission channel 17 between the DMA register 15 of the slave chip and the DMA controller 2 of the master chip.

It should be noted that in actual application, at least one first DMA request communication interface 13 may be disposed on the master chip. When a quantity of first DMA request communication interfaces 13 is 1, and a quantity of slave chips is greater than 1, the first DMA request communication interface 13 is separately connected to a second DMA request communication interface of each slave chip, to establish the first transmission channel 17 between the master chip and each slave chip. Alternatively, when a quantity of first DMA request communication interfaces 13 is the same as a quantity of slave chips, each first DMA request communication interface 13 may be correspondingly connected to a second DMA request communication interface 14 of one slave chip.

The master chip may include at least one first data transmission interface 8, one end of the first data transmission interface 8 is connected to the DMA controller 2 via the first bus 1, and the other end is connected to the slave chip, to form the second transmission channel 18. When a quantity of first data transmission interfaces 8 is 1, and a quantity of slave chips is greater than 1, the other end of the first data transmission interface 8 may be separately connected to each slave chip, so that the second transmission channel 18 is established between the master chip and each slave chip. Alternatively, when a quantity of first data transmission interfaces 8 is the same as a quantity of slave chips, each first data transmission interface 8 may be correspondingly connected to one slave chip.

Preferably, in this embodiment, the master chip may further include an interrupt controller 7, and the interrupt controller 7 may be connected between the DMA controller 2 and the MCU 3. After DMA data of a certain first peripheral 12 is transported completely, the DMA controller 2 may send an interrupt signal to the MCU 3 through the interrupt controller 7, to prompt the MCU 3. When the interrupt signal is received, the MCU 3 may update a working mode of the first peripheral 12 (that is, a first peripheral of which DMA data is transported completely), for example, change a working mode of the first peripheral 12 from a DMA mode to another mode.

In addition, the second peripheral 5 on the master chip may directly send, in a DMA mode, a generated DMA request to the DMA controller 2. The DMA controller 2 may access and obtain a corresponding second peripheral 5 through the first bus 1 when receiving the DMA request sent by the second peripheral 5, obtain DMA data of the second peripheral 5, and then store the obtained DMA data into the memory 4.

In comparison to the existing technology, in this embodiment, a first transmission channel 17 and a second transmission channel 18 are disposed between a slave chip and a master chip. When a DMA request is generated, a first peripheral 12 on the slave chip sends the DMA request to the DMA register, and the DMA register sends all current DMA requests to the master chip through the first transmission channel 17. When receiving all the current DMA requests of the slave chip, the master chip may obtain, through the second transmission channel 18, DMA data that is of the first peripheral 12 and that corresponds to each DMA request, so that the master chip may perform DMA data transmission with a plurality of peripherals on the slave chip.

A sixth embodiment of the present disclosure relates to a master chip. This embodiment is substantially the same as the fifth embodiment, and a main difference lies in that: in this embodiment, a DMA controller obtains, through a second transmission channel 18, all current DMA requests stored in a DMA register of a slave chip.

Figure 6:
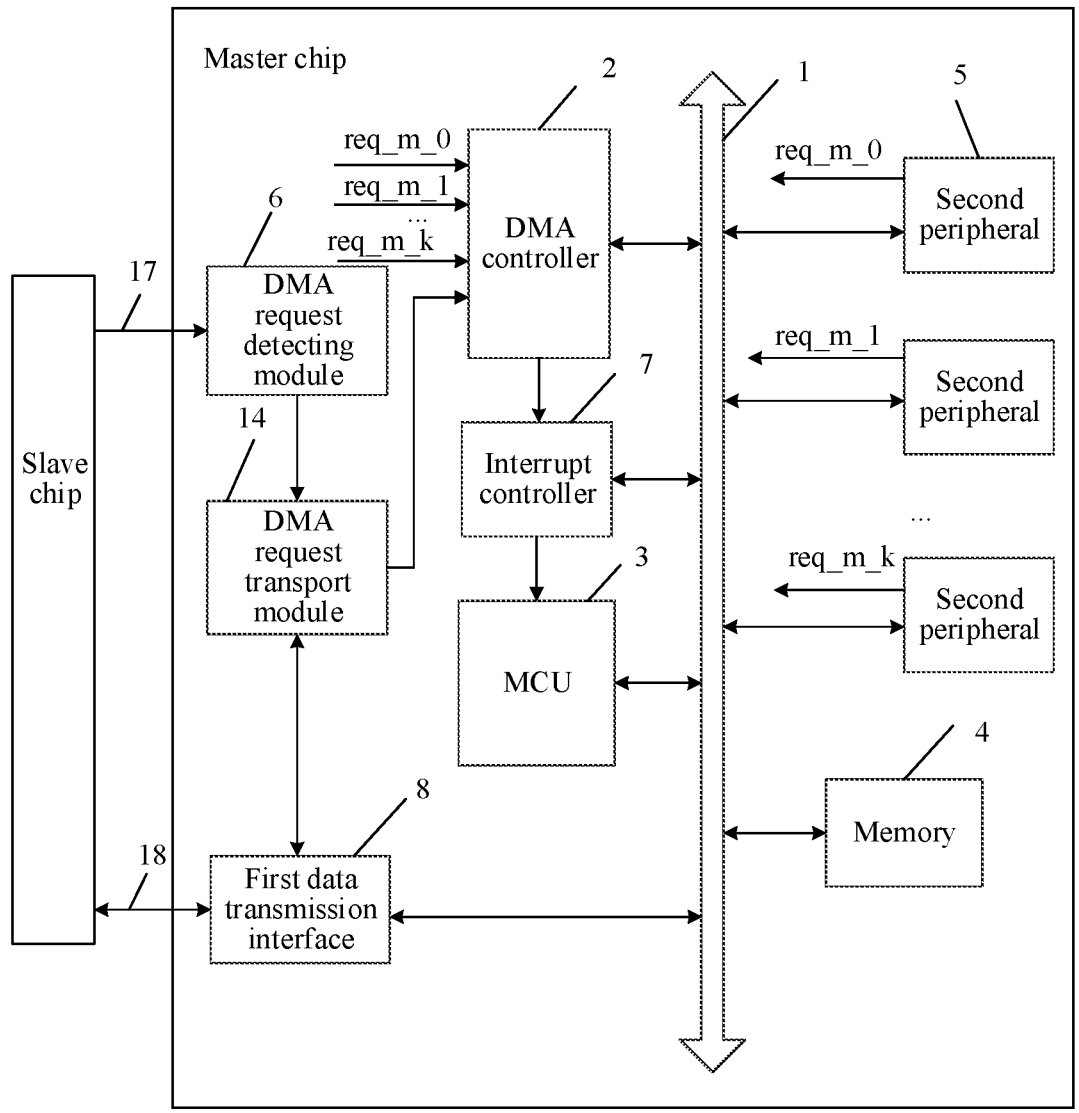
FIG. 6 is a schematic structural diagram of a master chip according to a sixth embodiment of the present disclosure.

As shown in FIG. 6, the master chip includes a first bus 1, a DMA controller 2, an MCU 3, a memory 4, and a plurality of second peripherals 5. The DMA controller 2, the MCU 3, the memory 4, and the plurality of second peripherals 5 are connected to the first bus 1, and the DMA controller 2 is further connected to the plurality of second peripherals 5.

Figure 10:
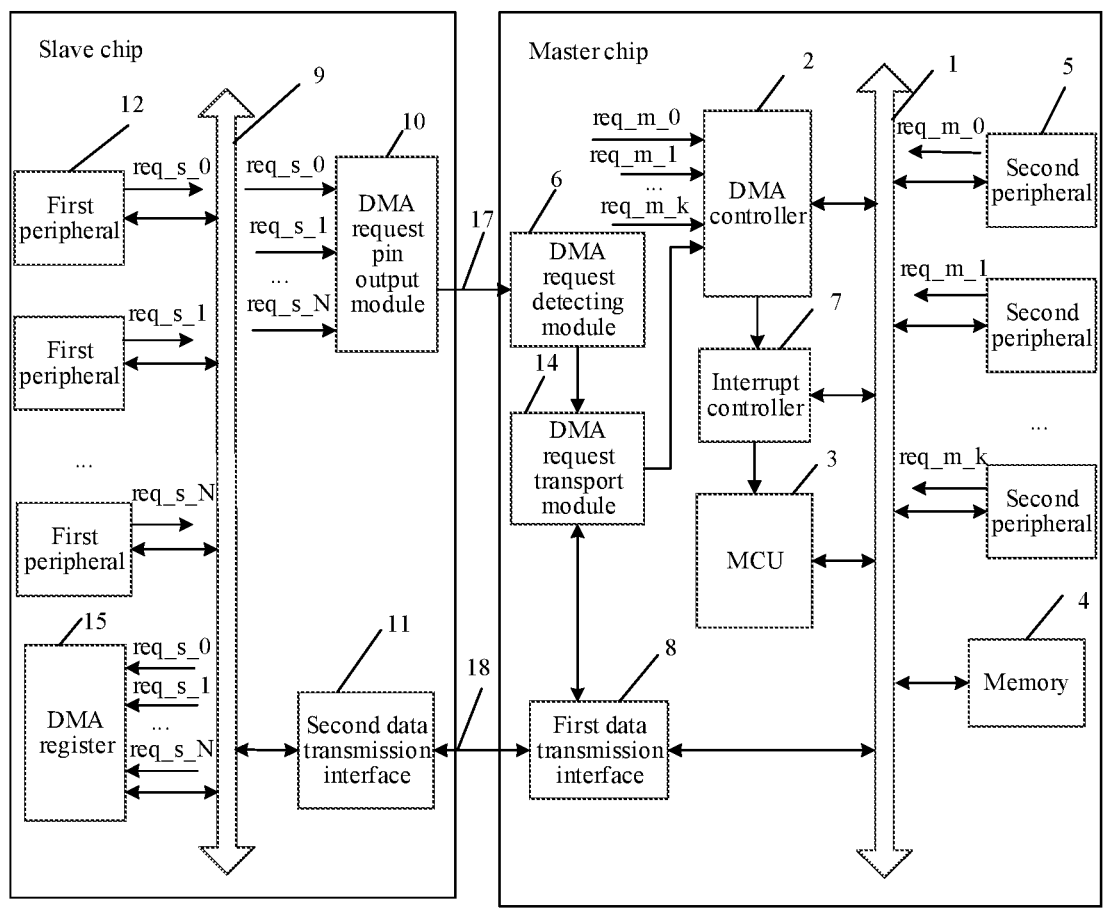
FIG. 10 is a schematic diagram of an inter-chip DMA transmission system according to an eleventh embodiment of the present disclosure.

Referring to FIG. 10, in this embodiment, the DMA controller 2 is configured to obtain, through the second transmission channel 18, all current DMA requests stored in a DMA register of the slave chip, and obtain, through the second transmission channel 18, DMA data that is of a first peripheral 12 and that corresponds to each DMA request.

In particular, in this embodiment, the slave chip includes a DMA register 15 and a DMA request pin output module 10, the DMA register 15 and the DMA request pin output module 10 being connected to a plurality of first peripherals 12 of the slave chip.

The MCU 3 on the master chip accesses the slave chip through the second transmission channel 18 in advance, and configures working modes of the plurality of first peripherals 12 on the slave chip into DMA modes. Any first peripheral 12 sends, in a DMA mode, a generated DMA request to the DMA register for storage, and the DMA request pin output module further sends, through the first transmission channel 17, the DMA request generated by the first peripheral 12 to the master chip.

The master chip may further include a DMA request detecting module 6 and a DMA request transport module 14, the DMA request detecting module 6 being connected to the DMA request transport module 14. The DMA request detecting module 6 is configured to detect the first transmission channel 17 in real time, and when detecting a DMA request sent by the slave chip through the first transmission channel 17, send the DMA request to the DMA request transport module 14. When the DMA request is received, the DMA request transport module 14 automatically controls the second transmission channel 18 by hardware, to obtain all current DMA requests stored in the DMA register 15, and sends all the DMA requests to the DMA controller 2. The DMA controller 2 may obtain, through the second transmission channel 18, DMA data that is of the first peripheral 12 and that corresponds to each DMA request when all current DMA requests of the slave chip are received, and store the obtained DMA data into the memory 4.

The first transmission channel 17 may be a DMA request line, and the DMA request line may be connected between the DMA request detecting module 6 and the DMA request pin output module of the slave chip.

Optionally, the master chip may further include at least one first data transmission interface 8, one end of the first data transmission interface 8 is respectively connected to the DMA request transport module 14 and the first bus 1, and the other end is connected to a second data transmission interface 11 of the slave chip, to form the second transmission channel 18. When a quantity of first data transmission interfaces 8 is 1, and a quantity of slave chips is greater than 1, the other end of the first data transmission interface 8 may be separately connected to each slave chip, so that the second transmission channel 18 is established between the master chip and each slave chip. Alternatively, when a quantity of first data transmission interfaces 8 is the same as a quantity of slave chips, each first data transmission interface 8 may be correspondingly connected to one slave chip.

In comparison to the fourth embodiment, this embodiment provides another method for obtaining all current DMA requests of a slave chip.

A seventh embodiment of the present disclosure relates to a master chip. The seventh embodiment is further improved on the basis of the fifth embodiment or the sixth embodiment, and a main modification is that: in this embodiment, the MCU 3 further configures, in the DMA controller in advance, a block size and a burst size that are of each first peripheral 12.

In particular, in this embodiment, before the first peripheral 12 of the slave chip performs DMA data transmission with the master chip, the MCU 3 in the master chip configures a relevant register of the DMA controller 2 in advance, for example, configures a DMA request of the slave chip as a request source of a certain channel of the DMA controller 2, and configures a DMA channel to be enabled, a DMA source address, a DMA destination address, and a block size and a burst size that are of each first peripheral 12.

After configuring the relevant register of the DMA controller 2, the MCU 3 further configures a register of the first peripheral 12 of the slave chip through the second transmission channel 18, for example, configures a working mode of the first peripheral 12 into a DMA mode. During operation of the first peripheral 12, a DMA request is generated when a current total amount of DMA data buffered in the register (that is, the register of the first peripheral 12) reaches the burst size.

For the slave chip of the fifth embodiment, the generated DMA request is stored into a DMA register 15. When receiving the DMA request, the DMA register 15 triggers the second DMA request communication interface 16 to automatically send, by hardware, a current value of the DMA register 15 to the master chip through the first transmission channel 17. The current value represents all current DMA requests of the slave chip. When the DMA request sent by the slave chip, the first DMA request communication interface 13 of the master chip sends the DMA request to the DMA controller 2.

For the slave chip of the sixth embodiment, when the DMA request is stored into the DMA register 15, the first peripheral 12 further triggers the DMA request pin output module 10 to send the DMA request to the master chip through the first transmission channel 17. When a DMA request sent through the first transmission channel 17 is detected, the DMA request detecting module 6 of the master chip sends the DMA request to the DMA request transport module 14. The DMA request transport module 14 reads, by automatically controlling a first data transmission interface 8 using hardware, a current value of the DMA register 15, and sends the current value to the DMA controller 2.

After the DMA controller 2 receives all current DMA requests of the slave chip, for the DMA request of each first peripheral 12, the DMA controller 2 obtains, through the second transmission channel 18, all DMA data (that is, DMA data of a burst size) currently buffered by the first peripheral 12, and stores all the DMA data into the memory 4. Afterwards, when a current total amount of DMA data buffered by the first peripheral 12 in the register reaches the burst size again, a DMA request is further generated. When receiving the DMA request, the DMA controller 2 of the master chip still obtains, through the second transmission channel 18, all DMA data (that is, DMA data of a burst size) currently buffered by the first peripheral 12, until a total amount of DMA data that is of the first peripheral 12 and that is obtained by the DMA controller 2 reaches the block size. When a total amount of DMA data transmission of a first peripheral 12 reaches the block size, the DMA controller 2 may output an interrupt signal to the MCU 3 through the interrupt controller 7. When receiving the interrupt signal, the MCU may update a working mode of the first peripheral 12.

In comparison to the fifth embodiment or the sixth embodiment, in this embodiment, the MCU configures, in the DMA controller 2, a block size and a burst size that are of each first peripheral 12, so that the master chip can quantitatively obtain DMA data of each first peripheral 12.

An eighth embodiment of the present disclosure relates to a slave chip. The slave chip may be a slave chip in a multi-chip system, the multi-chip system may include a master chip and at least one slave chip, and each slave chip may be connected to the master chip through a first transmission channel 17 and a second transmission channel 18 respectively. The master chip may be the master chip according to the fifth embodiment.

Figure 7:
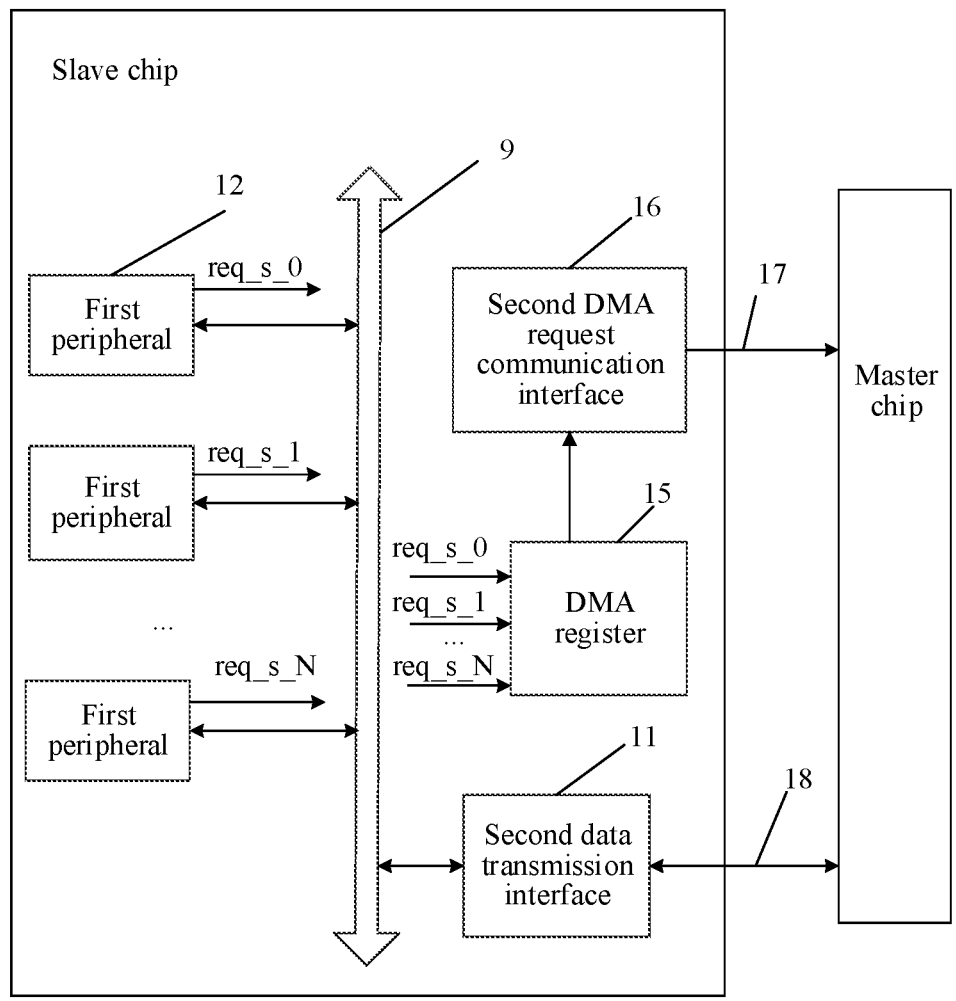
FIG. 7 is a schematic structural diagram of a slave chip according to an eighth embodiment of the present disclosure.

As shown in FIG. 7, the slave chip includes a second bus 9, a DMA register 15, a second DMA request communication interface 16, a second data transmission interface 11, and a plurality of first peripherals 12. The second data transmission interface 11 and the plurality of first peripherals 12 are connected to the second bus 9, and the DMA register 15 is separately connected to the plurality of first peripherals 12 and the second DMA request communication interface 16.

Any of the first peripherals 12 sends a generated DMA request to the DMA register 15 in a DMA mode. When receiving the DMA request, the DMA register 15 triggers the second DMA request communication interface 16 to automatically send, by hardware, a current value of the DMA register 15 to the master chip through the first transmission channel 17. The current value represents all current DMA requests of the slave chip. When receiving a DMA request sent by the slave chip through the first transmission channel 17, the first DMA request communication interface 13 of the master chip sends the DMA request to the DMA controller 2. When receiving all current DMA requests of the slave chip, the DMA controller 2 may access the first peripheral 12 through the second transmission channel 18, to obtain DMA data that is of the first peripheral 12 and that corresponds to each DMA request.

Because this embodiment may be implemented in mutual cooperation with the fifth embodiment, related technical details mentioned in the fifth embodiment are still valid in this embodiment, and a technical effect achieved in the fifth embodiment may also be achieved in this embodiment. In order to reduce repetition, details are not described herein again. Correspondingly, related technical details mentioned in this embodiment may also be applied to the fifth embodiment.

In comparison to the existing technology, in this embodiment, a first transmission channel 17 and a second transmission channel 18 are disposed between a slave chip and a master chip. When a DMA request is generated, the first peripheral on the slave chip sends the DMA request to the DMA register, and the DMA register sends all current DMA requests to the master chip through the first transmission channel 17. When receiving all current DMA requests of the slave chip, the master chip may obtain, through the second transmission channel 18, DMA data that is of the first peripheral and that corresponds to each DMA request, so that the master chip may perform DMA data transmission with a plurality of peripherals on the slave chip.

A ninth embodiment of the present disclosure relates to a slave chip. The slave chip may be a slave chip in a multi-chip system, the multi-chip system may include a master chip and at least one slave chip, and each slave chip may be connected to the master chip respectively through a first transmission channel 17 and a second transmission channel 18. The master chip may be the master chip according to the sixth embodiment.

Figure 8:
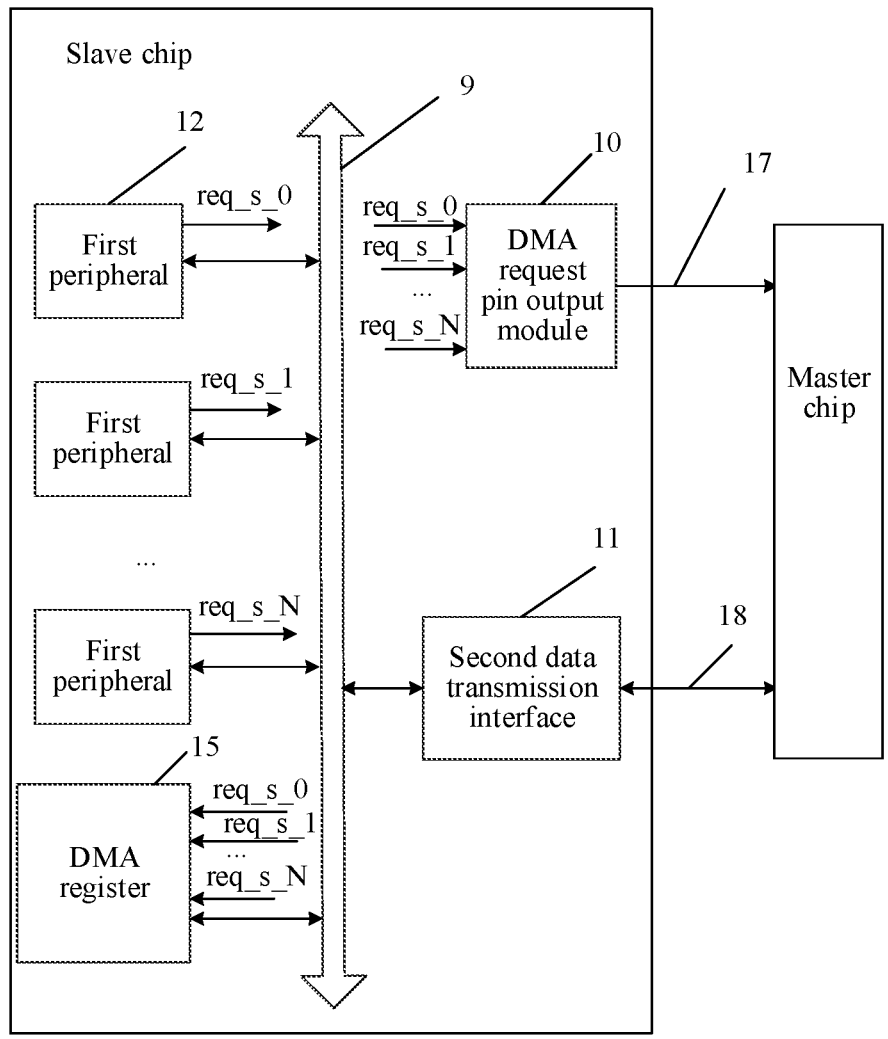
FIG. 8 is a schematic structural diagram of a slave chip according to a ninth embodiment of the present disclosure.

As shown in FIG. 8, the slave chip includes a second bus 9, a DMA register 15, a DMA request pin output module 10, a second data transmission interface 11, and a plurality of first peripherals 12. The second data transmission interface 11, the plurality of first peripherals 12, and the DMA register 15 are connected to the second bus 9, and the plurality of first peripherals 12 are further respectively connected to the DMA register 15 and the DMA request pin output module 10.

In this embodiment, any first peripheral 12 sends a generated DMA request to the DMA register 15 in a DMA mode, and the DMA request pin output module 10 may further send the DMA request to the master chip through the first transmission channel 17. When the DMA request sent by the slave chip through the first transmission channel 17 is detected, the master chip may read a current value of the DMA register 15 through the second transmission channel 18, thereby obtaining all current DMA requests of the slave chip. After receiving all the current DMA requests of the slave chip, the master chip may access the first peripheral 12 through the second transmission channel 18, to obtain DMA data that is of the first peripheral 12 and that corresponds to each DMA request.

Because this embodiment may be implemented in mutual cooperation with the sixth embodiment, related technical details mentioned in the sixth embodiment are still valid in this embodiment, and a technical effect achieved in the sixth embodiment may also be achieved in this embodiment. In order to reduce repetition, details are not described herein again. Correspondingly, related technical details mentioned in this embodiment may also be applied to the sixth embodiment.

A tenth embodiment of the present disclosure relates to an inter-chip DMA transmission system. The DMA transmission system includes the master chip according to the fifth embodiment or the seventh embodiment, and at least one slave chip according to the eighth embodiment.

As shown in FIG. 9, the master chip is connected to the slave chip respectively through a first transmission channel 17 and a second transmission channel 18.

In comparison to the existing technology, in this embodiment, a first transmission channel 17 and a second transmission channel 18 are disposed between a slave chip and a master chip. When a DMA request is generated, the first peripheral 12 on the slave chip sends the DMA request to the DMA register, and the DMA register sends all current DMA requests to the master chip through the first transmission channel 17, and when all current DMA requests of the slave chip are received, the master chip may obtain, through the second transmission channel 18, DMA data that is of the first peripheral 12 and that corresponds to each DMA request, so that the master chip may perform DMA data transmission with a plurality of peripherals on the slave chip.

An eleventh embodiment of the present disclosure relates to an inter-chip DMA transmission system. The DMA transmission system includes the master chip according to the sixth embodiment or the seventh embodiment, and at least one slave chip according to the ninth embodiment.

As shown in FIG. 10, the master chip is connected to the slave chip respectively through a first transmission channel 17 and a second transmission channel 18.

In comparison to the existing technology, in this embodiment, a first transmission channel 17 and a second transmission channel 18 are disposed between a slave chip and a master chip. When a DMA request is generated, the first peripheral 12 on the slave chip sends the DMA request to the DMA register, and sends the DMA request to the master chip through the first transmission channel 17. When the DMA request is detected, the master chip directly obtains, through the second transmission channel 18, all current DMA requests stored in the DMA register, and obtains, through the second transmission channel 18, DMA data that is of the first peripheral 12 and that corresponds to each DMA request, so that the master chip may perform DMA data transmission with a plurality of peripherals on the slave chip.

A person of ordinary skill in the art may understand that the foregoing embodiments are specific embodiments to implement the present disclosure, and variations can be made in forms and details in actual application without departing from the spirit and scope of the present disclosure.

What is claimed is:

1. A master chip, wherein the master chip is connected to a slave chip through at least one first transmission channel, and is connected to the slave chip through a second transmission channel; and the master chip comprises a DMA controller and a Microcontroller Unit (MCU), the MCU being connected to the DMA controller;

the MCU is configured to configure a certain first peripheral of a plurality of first peripherals of the slave chip into a DMA mode when it is detected that a certain first transmission channel of the at least one first transmission channel is in an idle state, and to allocate the certain first transmission channel to the certain first peripheral, so that the certain first transmission channel is occupied by the certain peripheral and is released and returns to the idle state after DMA data of the certain first peripheral is transmitted completely; and the DMA controller is configured to:

receive, a DMA request generated by a respective first peripheral in the DMA mode through a respective first transmission channel that is occupied by the respective first peripheral in the DMA mode, and obtain DMA data of the respective first peripheral in the DMA mode through the second transmission channel when receiving the DMA request;

each of the at least one first transmission channel is a DMA request line.

2. The master chip according to claim 1, wherein the MCU is further configured to configure in the DMA controller a block size and a burst size of each first peripheral; and the DMA controller is configured to obtain, when receiving the DMA request, a DMA data buffered in a first peripheral in the DMA mode, until a total amount of the DMA data of the first peripheral in the DMA mode obtained by the DMA controller reaches the block size; wherein after the first peripheral is configured into the DMA mode, the DMA request is generated when a current total amount of the DMA data buffered in the first peripheral in the DMA mode reaches the burst size.

3. The master chip according to claim 2, wherein the master chip further comprises an interrupt controller, the interrupt controller is connected between the DMA controller and the MCU;

the DMA controller is further configured to output an interrupt signal to the MCU via the interrupt controller when the total amount of the DMA data of the first peripheral in the DMA mode obtained by the DMA controller reaches the block size; and the MCU is configured to determine, when receiving the interrupt signal, that a first transmission channel for transmitting the DMA request of the first peripheral in the DMA mode is in the idle state.

4. The master chip according to claim 1, wherein the master chip further comprises a DMA request detecting module, the DMA request detecting module is connected to the DMA controller; and the DMA request detecting module is configured to detect the DMA request sent through the at least one first transmission channel, and send the DMA request to the DMA controller.

5. The master chip according to claim 1, wherein the master chip further comprises at least one first data transmission interface, having one end connected to the DMA controller, and another end connected to the slave chip, to form the second transmission channel.

6. A master chip, wherein the master chip is connected to a slave chip including a plurality of first peripherals and a DMA register, through a first transmission channel and a second transmission channel respectively; and wherein:

the master chip comprises a DMA controller and a Microcontroller Unit (MCU) coupled to the DMA controller;

the MCU is configured to configure a certain first peripheral of the plurality of first peripherals of the slave chip into a DMA mode when it is detected that the first transmission channel is in an idle state, so that the first transmission channel is allocated to the certain first peripheral and the certain first peripheral generates a certain DMA request and sends the certain DMA request to the DMA register;

the DMA register is configured to store the DMA request sent by the certain first peripheral, and send a current value of the DMA register to the DMA controller; and the DMA controller is configured to:

obtain, through the first transmission channel or the second transmission channel, the DMA request generated by the certain first peripheral and stored in the DMA register, and obtain, through the second transmission channel, DMA data of the certain first peripheral corresponding to the certain DMA request;

wherein the first transmission channel is occupied by the certain first peripheral when the DMA controller is in a process of obtaining the DMA data and is released after the process of obtaining the DMA data is complete.

7. The master chip according to claim 6, wherein the master chip comprises at least one first data transmission interface and at least one first DMA request communication interface;

one end of the first data transmission interface is connected to the DMA controller, and another end is connected to the DMA register, to form the second transmission channel; and one end of the first DMA request communication interface is connected to the DMA controller, and another end is connected to a plurality of first peripherals of the slave chip, to form the first transmission channel.

8. The master chip according to claim 6, wherein the master chip further comprises a DMA request transport module, the DMA request transport module is connected to the DMA controller;

the DMA request transport module is configured to obtain, when receiving the DMA request output by any of the plurality of first peripherals through the first transmission channel, all current DMA requests stored in the DMA register by automatically controlling the second transmission channel via hardware, and send all the DMA requests to the DMA controller; and the DMA controller is configured to obtain, through the second transmission channel, a DMA data of a respective first peripheral corresponding to each DMA request.

9. The master chip according to claim 8, wherein the master chip further comprises at least one first data transmission interface, having one end being separately connected to the DMA controller and the DMA request transport module, and another end being connected to the plurality of first peripherals and the DMA register, to form the second transmission channel.

10. The master chip according to claim 8, wherein the master chip further comprises a DMA request detecting module, the DMA request detecting module is connected to the DMA request transport module; and the DMA request detecting module is configured to detect the DMA request output through the first transmission channel, and send, to the DMA request transport module, the DMA request output through the first transmission channel.

11. The master chip according to claim 6, wherein the master chip further comprises a Microcontroller Unit (MCU), the MCU is connected to the DMA controller; and the MCU is configured to configure one of the plurality of first peripherals into a DMA mode, so that a first peripheral in the DMA mode generates the DMA request.

12. The master chip according to claim 11, wherein the MCU is further configured to configure, in the DMA controller, a block size and a burst size of each of the plurality of first peripherals; and the DMA controller is configured to obtain a DMA data buffered in the first peripheral in the DMA mode when the DMA request is obtained, until a total amount of the DMA data of the first peripheral in the DMA mode obtained by the DMA controller reaches the block size; wherein after the first peripheral is configured into the DMA mode, the DMA request is generated when a current total amount of the DMA data buffered in the first peripheral in the DMA mode reaches the burst size.

13. The master chip according to claim 12, wherein the master chip further comprises an interrupt controller, the interrupt controller is connected between the DMA controller and the MCU;

the DMA controller is further configured to output an interrupt signal to the MCU via the interrupt controller when the total amount of the DMA data of the first peripheral obtained by the DMA controller reaches the block size; and the MCU is configured to update a working mode of the first peripheral when receiving the interrupt signal.

14. An inter-chip DMA transmission system, comprising:
at least one first transmission channel, configured to transfer a DMA request; each of the at least one first transmission channel being a DMA request line;
a second transmission channel, configured to transfer a DMA data;
a slave chip, comprising:
 a plurality of first peripherals, each of the plurality of first peripherals being configured to generate, when being in a DMA mode, the DMA request; and
a master chip, comprising:
 a Microcontroller Unit (MCU), configured to configure a certain first peripheral of the plurality of first peripherals into a DMA mode when it is detected that a certain first transmission channel of the at least one first transmission channel is in an idle state, and to allocate the certain first transmission channel to the certain first peripheral, so that the certain first transmission channel is occupied by the certain first peripheral and is released and returns to the idle state after DMA data of the certain first peripheral is transmitted completely; and
 a DMA controller, configured to be connected to the MCU, and to obtain the DMA request through a respective first transmission channel that is occupied by a respective first peripheral that has generated the DMA request, and obtain a DMA data of the respective first peripheral corresponding to the DMA request through the second transmission channel.

15. The inter-chip DMA transmission system according to claim 14, wherein the MCU is further configured to configure in the DMA controller a block size and a burst size of each first peripheral.

16. The master chip according to claim 8, wherein the master chip further comprises a first DMA request communication interface, configured to receive all current DMA requests and send all current DMA requests to the DMA controller;

the DMA controller is further configured to successively obtain, in descending order of priority, DMA data of a respective first peripheral that corresponds to each DMA request, in according with a respective priority pre-set for each first peripheral.

* * * * *